United States Patent [19]

Zuckerman

[11] 4,070,768
[45] Jan. 31, 1978

[54] INFORMATION LOCATING SYSTEM AND METHOD

[76] Inventor: Irving Zuckerman, 19 Lyons Place, Larchmont, N.Y. 10538

[21] Appl. No.: 687,912

[22] Filed: May 19, 1976

[51] Int. Cl.² ................................................ G09B 3/00
[52] U.S. Cl. ................................. 35/8 R; 35/9 R; 35/48 A
[58] Field of Search ............... 35/8 R, 9 R, 17, 48 R, 35/48 A; 235/61.12 R

[56] References Cited

U.S. PATENT DOCUMENTS

| | | | |
|---|---|---|---|
| 1,526,717 | 2/1925 | Nunez | 35/17 |
| 2,155,814 | 4/1939 | Wolfe | 35/9 R |

*Primary Examiner*—William H. Grieb
*Attorney, Agent, or Firm*—C. Bruce Hamburg

[57] ABSTRACT

A system for locating information in an information bank comprises an index and a key for the index. The index comprises a sheet bearing an array of indicia identifying the locations of information in the information bank. The key comprises a card having an array of closed windows which are registrable with the array of indicia and bearing legends for guiding a person to open a particular one or more of the windows depending upon the information which is to be located in the information bank. The window or windows which are opened register with indicia identifying the location of the information which is to be located in the information bank when the array of windows is registered with the array of indicia. The method of using the system to locate information in an information bank comprises opening at least one of the windows on the card in accordance with the legends on the card, registering the array of windows on the card with the array of indicia on the index sheet and reading the indicia appearing through the open windows to thereby determine the location of the desired information in the information bank.

12 Claims, 3 Drawing Figures

U.S. Patent  Jan. 31, 1978  4,070,768
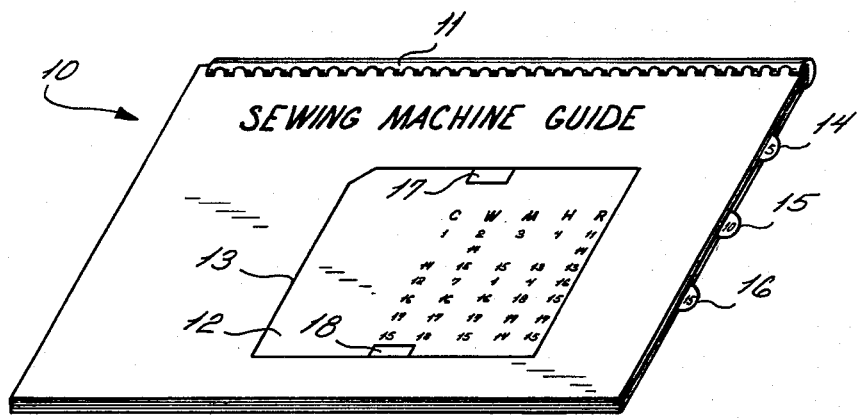
FIG. 1
FIG. 2
FIG. 3
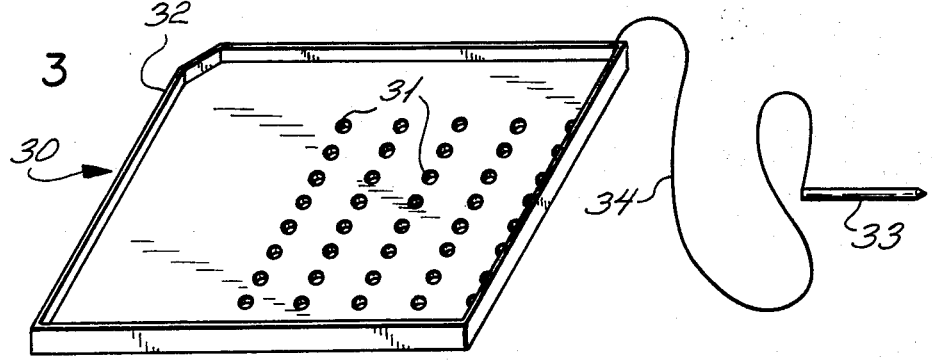

INFORMATION LOCATING SYSTEM AND METHOD

BACKGROUND OF THE INVENTION

This invention relates to a system for locating information and to the method of using the system. More particularly, this invention relates to a system for locating information in an information bank and to the method for using that system.

Persons shopping for a highly specialized, relatively high priced item, such as an automobile, sewing machine, carpeting, furniture and the like, need ready access to information to help them make a selection which is best for them. Similarly, a salesperson needs ready access to the same information to help him make the sale. Presently utilized catalogs, brochures, displays and the like do not adequately satisfy these needs.

It is, therefore, an object of the present invention to provide a system for locating information and a corresponding method for using the system, which will much more adequately satisfy the aforementioned needs.

Other objects and advantages of the invention will be apparent to one skilled in the art from the following description of the invention.

SUMMARY OF THE INVENTION

According to the invention, there is provided a system for locating information in an information bank, comprising an index and a key for the index, the index comprising a sheet bearing an array of indicia identifying the locations of information in the information bank and the key comprising a card having an array of closed windows which are registrable with the array of indicia and bearing legends for guiding a person to open a particular one or more of the windows depending upon the information which is to be located in the information bank, the one or more windows which are accordingly opened registering with the indicia identifying the location of the information which is to be located in the information bank when the array of windows is registered with the array of indicia. The method of using the system according to the invention to locate information in an information bank comprises opening at least one of the windows on the card in accordance with the legends on the card, registering the array of windows on the card with the array of indicia on the index sheet and reading the indicia appearing through the open windows to thereby determine the location of the desired information in the information bank.

It is particularly convenient that the system include the information bank itself. The information bank may comprise a set of paginated sheets bound together and bearing legends and/or other indicia, such as diagrams, embodying the information. The index sheet may be bound together with the other sheets. For example, the index sheet may also serve as the cover of the information bank, also carying the title of the information bank.

In a particularly convenient arrangement according to the invention, each of the windows on the key card comprises an area of the card having a boundary which is weaker than portions of the card surrounding the boundary. Consequently, the window may be opened by punching out the area of the card defined by the aforementioned boundary. It is convenient that the system also include a stylus for punching out the windows, though, of course, any conveniently available pencil or like instrument may serve as the stylus.

It is preferred that the system include means integral with the index sheet for assisting registering of the array of windows with the array of indicia. For example, the registering assistance means may comprise flaps spaced on the index sheet for holding the card at opposed edges of the card.

The system may also include a template having an array of apertures corresponding to the array of windows whereby the card may be laid on the template to support the card while one or more of the windows are being punched out. The template may include walls bounding an area corresponding to the dimensions of the card thereby to assist registry of the windows on the card with the apertures in the template. For the purpose of assisting a person using the system in registering the windows on the card with the apertures on the template and with the array of indicia on the index sheet by helping prevent the user from incorrectly orienting the card relative to the template or the array of indicia on the index sheet, the card may be asymmetrical with the bounded area on the template corresponding thereto and indicia provided on the sheet to denote a like asymmetrical area.

BRIEF DESCRIPTION OF THE DRAWINGS

The invention will now be further described by reference to a preferred embodiment thereof, as illustrated in the drawings, in which:

FIG. 1 is an isometric view of an index sheet bound together with other sheets containing the information constituting an information bank;

FIG. 2 is a plan view of a key card for use with the index sheet of FIG. 1; and

FIG. 3 is an isometric view of a template with a stylus attached thereto for use with the card of FIG. 2.

DESCRIPTION OF THE PREFERRED EMBODIMENT

With reference to FIG. 1, a combined index sheet and information bank 10 according to the invention is illustrated. The combination 10 is in the form of a "flipchart". The sheets of the flipchart 10 are held together by a conventional ribbed plastic spine 11 the ribs of which pass through apertures in the sheets. The cover of the flipchart serves both as a cover and as the sheet for the index. Fulfilling the cover function of this top sheet of the flipchart is a title characterizing the information contained on the other sheets of the chart, namely, "sewing machine guide". The area 12 on the top sheet of the flipchart 10, which area is defined by an imprinted boundary 13, fulfills the index sheet function of the top sheet of the flipchart.

The index 12 includes an array of indicia identifying the location of information in the information bank, that is, on the other sheets of the flipchart. These indicia consist of the numbers one to eighteen, inclusive, and the letters C, W, M, H and R. The letters stand, respectively, for children's clothing, women's clothing, men's clothing, home furnishings and repairs and alterations.

Apart from the front cover and a back cover, the flipchart comprises eighteen sheets constituting the information bank. The sheets of the information bank are successively paginated with the numbers one to eighteen, inclusive, corresponding to the numbers one to eighteen on the index 12. Pages 5, 10 and 15 of the information bank are provided with correspondingly numbered tabs 14, 15, and 16 to facilitate rapid location of a desired sheet of the information bank. The information bank describes, by way of words and diagrams, features of the products of and related services offered by a certain sewing machine manufacturer. Each sheet of the information bank carries a title characterizing the information contained on that sheet. The respective titles of sheets one to eighteen are "buttonholing", "stretch stitch", "overedge stretch stitch", "adjustable maxi-stretch stitch", "speed basting", "mending", "blindstitching", "ric-rac stitch", "buttons", "decorative touches (satin, applique, special stitches)", "flip and sew (circular sewing)", "even-feed foot", "decorative stitching", "learn to sew", "money-saving sewing", "sewing features" of the particular manufacturer's line of machines summarized, "sew anywhere" (a summary of particular locations and conditions for which various model sewing machines of the manufacturer are suited) and "service and maintenance" (a summary of service and maintenance arrangements offered by the manufacturer).

Augmenting the numeric paginations of sheets one to eighteen are the letter combinations "CWM" on sheets 1 to 4 and 9 indicating that the information on these sheets is particularly pertinent to children's, women's and men's clothing and on other of the sheets of the information bank are other combinations of the letters C, W, M, H and R augmenting the paginations of those sheets to indicate that the respective sheets have particular pertinence to the fields which are symbolized by these letters.

The combined cover-index sheet is provided with die-cut flaps 17 and 18 for assisting correct positioning of the key card 20, illustrated in FIG. 2, over the index 12 by holding the card 20 onto the index 12 by overlapping the card 20 at opposed edges 20a and 20b of the card 20.

An array of windows 21 is provided on the card 20. Each of the windows 21 is constituted of a partially diecut small circular area of about the diameter of a pencil near the point of the pencil. The partial die-cutting renders the circular boundary of the area defining each window 21 weaker than the surrounding portions of the card whereby the window is readily opened by punching out the circular area with a pencil, ballpoint pen or other stylus or stylus-like implement.

The key card bears legends for guiding a person to open particular windows 21 depending upon the information which is to be located in the information bank. In the particular embodiment illustrated in FIG. 2, these legends consist of a series of consecutively lettered (A to I) questions or incomplete sentences aligned with nine respective rows each containing five windows and adjacent legends each representing an answer to the corresponding question or the balance of the corresponding incomplete sentence.

A template 30 (FIG. 3) is provided, which facilitates use of the card 20. The template 30 is provided with an array of apertures 31 corresponding in configuration to the array of windows 21 and being of diameter very slightly larger than the windows 21. The template 30 is also provided with walls 32 bounding an area corresponding to the card 20 and to the index 12. It will be noted that each of these areas is asymmetrical because it is a rectangle having one corner cut off. The provision of the cut off corner helps assure that the user orients the card 20 correctly with respect to the template 30 and the index 12.

A stylus 33, which may be a pencil or ballpoint pen, for example, is fastened to the template 30 by means of a string or chain 34.

The method of using the system to locate information in the information bank is very convenient. The user places the card 20 on the template 30. The card 20 thus being conveniently supported, the user takes the stylus 33 in hand, consecutively considers the questions or incomplete sentences A to I and punches out those of the windows 21 the legends adjacent to which answer the respective question or complete the respective sentence in one or more ways which correspond to information provided by the customer. The punched out window areas fall through corresponding apertures 31 in the template 30.

The user then slips the card 20 under the flaps 17 and 18 on the cover-index sheet of the flipchart 10 and aligns the periphery of the card 20 with the imprinted boundaries 13 of the index area 12 on the cover-index sheet.

Assume for example that question A was answered by punching out the windows 21 indicating that the customer would like to sew "children's clothing" and "fashions for me" (i.e., women's clothing). Also assume that incomplete sentence F was completed by punching out the windows 21 which would complete the sentence by indicating that the customer wished her next machine to be "easy to control" and "simple to adjust". When the card 20 would be correctly aligned over the index 12, certain indicia on the index 12 would appear through the open windows. In particular, through the open window indicating that the customer liked to sew children's clothing and clothing for herself would, respectively, appear the indicia "C" and "W" and through the open windows indicating that the customer wished her next sewing machine to be easy to control and simple to adjust would appear the indicia "16" in both instances. In this manner, the locations of the relevant information in the information bank are provided. Thus, regarding question A, one is informed that the relevant information is contained on each of the sheets in the information bank having pagination augmented with the letter "C" (for children's clothing) or with the letter "W" (for women's clothing). Similarly, one is informed that information relevant to easy controllability and simple adjustability of the sewing machine is found, in both instances, on sheet 16 of the information bank.

While the invention has been particularly described with reference to a specific embodiment thereof, it is to be understood that this embodiment is intended to illustrate rather than to limit the invention.

What is claimed is:

1. A system for locating information in an information bank, comprising an index and a key for the index, the index comprising an integral sheet not part of the information bank and bearing an array of indicia identifying the locations of information in the information bank and the key comprising a card having an array of closed windows which are registrable with the array of indicia, the key bearing legends for guiding a person to open a particular one or more of said windows depending upon the information which is to be located in the information bank and the windows not bearing any legends, the at least one window which is accordingly opened registering with indicia identifying the location of the information which is to be located in the information bank when the array of windows is registered with the array of indicia.

2. A system according to claim 1, further comprising an information bank.

3. A system according to claim 1, in which the information bank comprises a set of paginated sheets bound together and bearing at least one of legends and other indicia embodying the information.

4. A system according to claim 3, in which the index sheet is bound together with the other sheets.

5. A system according to claim 1, in which each of said windows comprises an area of the card having a boundary which is weaker than portions of the card surrounding the boundary whereby the window may be opened by punching out the area of the card defined by said boundary.

6. A system according to claim 5, further comprising means integral with the index sheet for assisting registering of the array of windows with said array of indicia.

7. A method of using the system according to claim 1 to locate information in an information bank, comprising opening at least one of the windows on the card in accordance with the legends on the card, registering the array of windows on the card with the array of indicia on the index sheet and reading the indicia appearing through the open windows to thereby determine the location of the desired information in the information bank.

8. A system for locating information in an information bank, comprising an index and a key for the index, the index comprising a sheet bearing an array of indicia identifying the locations of information in the information bank and the key comprising a card having an array of closed windows which are registrable with the array of indicia and bearing legends for guiding a person to open a particular one or more of said windows depending upon the information which is to be located in the information bank, flaps integral with the index sheet and spaced on the index sheet for holding the card at opposed edges of the card for assisting registering of said array of windows with said array of indicia, each of said windows comprising an area of the card having a boundary which is weaker than portions of the card surrounding the boundary whereby the window may be opened by punching out the area of the card defined by said boundary, the at least one window which is accordingly opened registering with indicia identifying the location of the information which is to be located in the information bank when the array of windows is registered with the array of indicia.

9. A system for locating information in an information bank, comprising an index, a key for the index and a template, the index comprising a sheet bearing an array of indicia identifying the locations of information in the information bank, the key comprising a card having an array of closed windows which are registrable with the array of indicia and bearing legends for guiding a person to open a particular one or more of said windows depending upon the information which is to be located in the information bank, each of said windows comprising an area of the card having a boundary which is weaker than portions of the card surrounding the boundary whereby the window may be opened by punching out the area of the card defined by said boundary, the template having an array of apertures corresponding to the array of windows whereby the card may be laid on the template to support the card while one or more of the windows are being punched out.

10. A system according to claim 9, further comprising a stylus for punching out the windows.

11. A system according to claim 9, in which said template includes walls bounding an area corresponding to two dimensions of the card thereby to assist registering of the windows on the card with the apertures in the template.

12. A system according to claim 11, in which the card is asymmetrical, said bounded area on the template corresponds thereto and said index bears indicia to denote a like asymmetrical area thereby to assist registry of the windows on the card with the apertures on the template and with the array of indicia on the index sheet.

* * * * *

UNITED STATES PATENT AND TRADEMARK OFFICE
CERTIFICATE OF CORRECTION

PATENT NO. : 4070768
DATED : January 31, 1978
INVENTOR(S) : Irving Zuckerman

It is certified that error appears in the above-identified patent and that said Letters Patent are hereby corrected as shown below:

Column 1, line 58, change "carying" to --carrying--.

Column 5, line 5, change "claim 1" to --claim 2--.

Signed and Sealed this

Second Day of May 1978

[SEAL]

Attest:

RUTH C. MASON
Attesting Officer

LUTRELLE F. PARKER
Acting Commissioner of Patents and Trademarks